(12) United States Patent
Huang (10) Patent No.: US 6,295,091 B1
(45) Date of Patent: Sep. 25, 2001

(54) METHOD AND APPARATUS FOR DE-INTERLACING VIDEO FIELDS FOR SUPERIOR EDGE PRESERVATION

(75) Inventor: Samson Huang, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 08/966,079

(22) Filed: Nov. 7, 1997

(51) Int. Cl.$^7$ .............................. H04N 7/01; H04N 11/20
(52) U.S. Cl. ........................ 348/448; 348/458; 382/262
(58) Field of Search .................................. 345/452, 448, 345/450, 451, 458, 154, 152; 382/299, 300, 298, 278, 262; 348/561, 562, 581, 582; H04N 7/01, 11/20

(56) References Cited

U.S. PATENT DOCUMENTS

| | | | |
|---|---|---|---|
| 5,119,193 | * 6/1992 | Noji | 348/452 |
| 5,475,438 | * 12/1995 | Bretl | 348/452 |
| 5,579,053 | * 11/1996 | Pandel | 348/448 |
| 6,133,957 | * 10/2000 | Campbell | 348/458 |

* cited by examiner

Primary Examiner—Michael Lee
(74) Attorney, Agent, or Firm—Blakely, Sokoloff, Taylor & Zafman LLP

(57) ABSTRACT

Methods of interpolating missing pixels between interlaced scan lines is disclosed. A first method interpolates a desired pixel by selecting the median pixel from a first pixel above and to the left of the desired pixel, a second pixel above the desired pixel, a third pixel above and to the right of the desired pixel, a fourth pixel below and to the left of the desired pixel, a fifth pixel below the desired pixel, a sixth pixel below and to the right of the desired pixel, and a seventh pixel from the previous video field having same position of the desired pixel. A second method of interpolating a desired pixel between scan lines first selects a minimal variance direction between: a first direction comprising a first pixel above and to the left of the desired pixel and a second pixel below and to the right of the desired pixel, a second direction comprising a third pixel above the desired pixel and a fourth pixel below the desired pixel, and a third direction comprising a fifth pixel above and to the right of the desired pixel and a sixth pixel below and to the left of the desired pixel. Then the second method selects the two pixels comprising the minimal variance direction as a minimal variance above pixel and a minimal variance below pixel. Finally, the second method selects the median pixel of the minimal variance above pixel, the minimal variance below pixel, and a pixel from the previous video field having same position of the desired pixel.

10 Claims, 10 Drawing Sheets

PixelOut=PixelPrevious

PixelOut = (PixelAbove + PixelBelow) / 2

*Figure 5*

⊠ = Pixel from previous even field

PixelOut = Motion[(PixelAbove+PixelBelow) / 2] = (1-Motion)PixelPrevious
PixelOut = Median(PixelAbove, PixelBelow, PixelPrevious)

Figure 6

⊠ = Pixel from previous even field

PixelOut = Median(PixelAboveLeft, PixelAbove, PixelAboveRight,
    PixelBelowLeft, PixelBelow, PixelBelowRight, PixelPrevious)

METHOD AND APPARATUS FOR DE-INTERLACING VIDEO FIELDS FOR SUPERIOR EDGE PRESERVATION

FIELD OF THE INVENTION

The present invention relates to the field of computer graphics and video processing. More specifically the present invention relates to a method and apparatus for de-interlacing video fields.

BACKGROUND OF THE INVENTION

In order to reduce the amount of information that needs to be transmitted television broadcast formats use an interlaced video signal. In an interlace video signal format only half the lines that comprise full image are transmitted during each scan field. Thus, during each scan of the television screen, every other scan line is transmitted. Specifically, first the odd scan lines are transmitted and then the even scan lines are transmitted in an alternating fashion. The two fields are interlaced together to construct a full video frame. In the American National Television Standards Committee (NTSC) television format, each field is transmitted in one sixtieth of a second. Thus, a full video frame (an odd field and an even field) is transmitted each one thirtieth of a second.

Computer monitors do not use the interlace video format. Instead, computer monitors use a progressive format where an entire video image is drawn in a single frame scan. Thus, during each frame scan of the monitor, every scan line is refreshed.

In order to display an interlaced television signal on a non-interlaced computer monitor the interlace video signal must be de-interlaced. De-interlacing consist of filling in the missing even or odd scan lines in each field such that each field becomes a full video frame. The process of creating the missing odd or even scan lines for the even or odd fields respectively is referred to as line-doubling.

The video recording, video editing, and video display have become popular applications of computer systems. Since video applications have become so important, high quality video de-interlacing techniques are needed.

SUMMARY OF THE INVENTION

Methods of interpolating missing pixels between interlaced scan lines is disclosed. A first method interpolates a desired pixel by selecting the median pixel from a first pixel above and to the left of the desired pixel, a second pixel above the desired pixel, a third pixel above and to the right of the desired pixel, a fourth pixel below and to the left of the desired pixel, a fifth pixel below the desired pixel, a sixth pixel below and to the right of the desired pixel, and a seventh pixel from the previous video field having same position of the desired pixel.

A second method of interpolating a desired pixel between scan lines first selects a minimal variance direction between: a first direction comprising a first pixel above and to the left of the desired pixel and a second pixel below and to the right of the desired pixel, a second direction comprising a third pixel above the desired pixel and a fourth pixel below the desired pixel, and a third direction comprising a fifth pixel above and to the right of the desired pixel and a sixth pixel below and to the left of the desired pixel. Then the second method selects the two pixels comprising the minimal variance direction as a minimal variance above pixel and a minimal variance below pixel. Finally, the second method selects the median pixel of the minimal variance above pixel, the minimal variance below pixel, and a pixel from the previous video field having same position of the desired pixel.

Other objects feature and advantages of present invention will be apparent from the company drawings and from the following detailed description that follows below.

BRIEF DESCRIPTION OF THE DRAWINGS

The objects, features and advantages of the present invention will be apparent to one skilled in the art, in view of the following detailed description in which:

FIG. 8b illustrates an example interpolation using the three interpolation directions of FIG. 8a.

FIG. 9 illustrates a flow diagram describing a method of interpolating a pixel using the tree interpolation directions of FIG. 8a.

DETAILED DESCRIPTION

A method and apparatus for computer graphics and video processing is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to the NTSC video standard. However, the teachings of the present invention can easily be applied to other types of video standards such as PAL and SECAM.

NTSC Interlaced Video

National Television Standards Committee (NTSC) video is constructed of alternating odd and even fields of scan lines. The odd and even scan lines are alternatingly displayed in an interlaced manner to display a full motion video. A pair of consecutive (odd and even) video fields are often referred to as a video frame.

Figure 1:
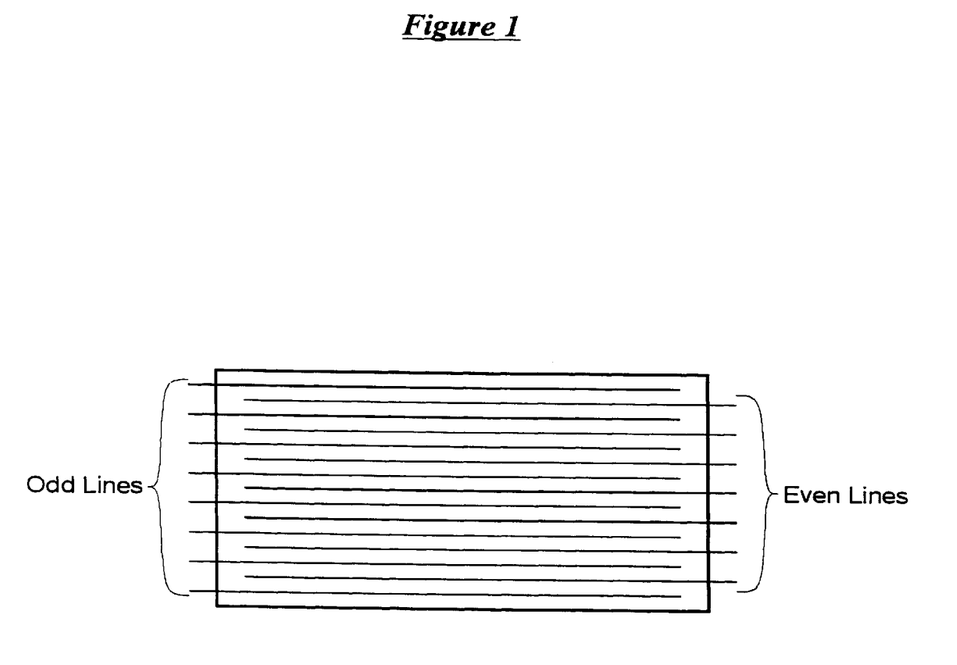
FIG. 1 graphically illustrates a typical NTSC video frame comprised of two video fields (an odd field and an even field).

FIG. 1 graphically illustrates how a video frame is constructed. A first set of odd scan lines are first scanned onto the display. After the odd scan lines have been scanned, the even scan lines are scanned in between each of the odd scan lines as illustrated in FIG. 1. A next sequential set of odd scan lines are then scanned. The even and odd scan lines continue alternating to construct a motion video image.

To display an interlaced video image on a computer monitor, the interlaced video must first be de-interlaced since computer monitors display information in a progressive (every line is scanned each frame) format. Specifically, an odd video field consisting of only odd scan lines must have the missing even scan lines filled and an even video field consisting of only even lines must have all the odd scan lines filled. This process is known as line-doubling.

The simplest method of performing video de-interlacing is to fill the missing scan lines with the scan lines of the previous video field. Thus if an odd field needs to be displayed, the scan lines from the previous even field are used to complete the video frame. This method generates excellent results when there is no motion in the video image. However, if there is motion in the video image then this technique results in severe saw-tooth motion artifacts or motion blur.

Figure 2:
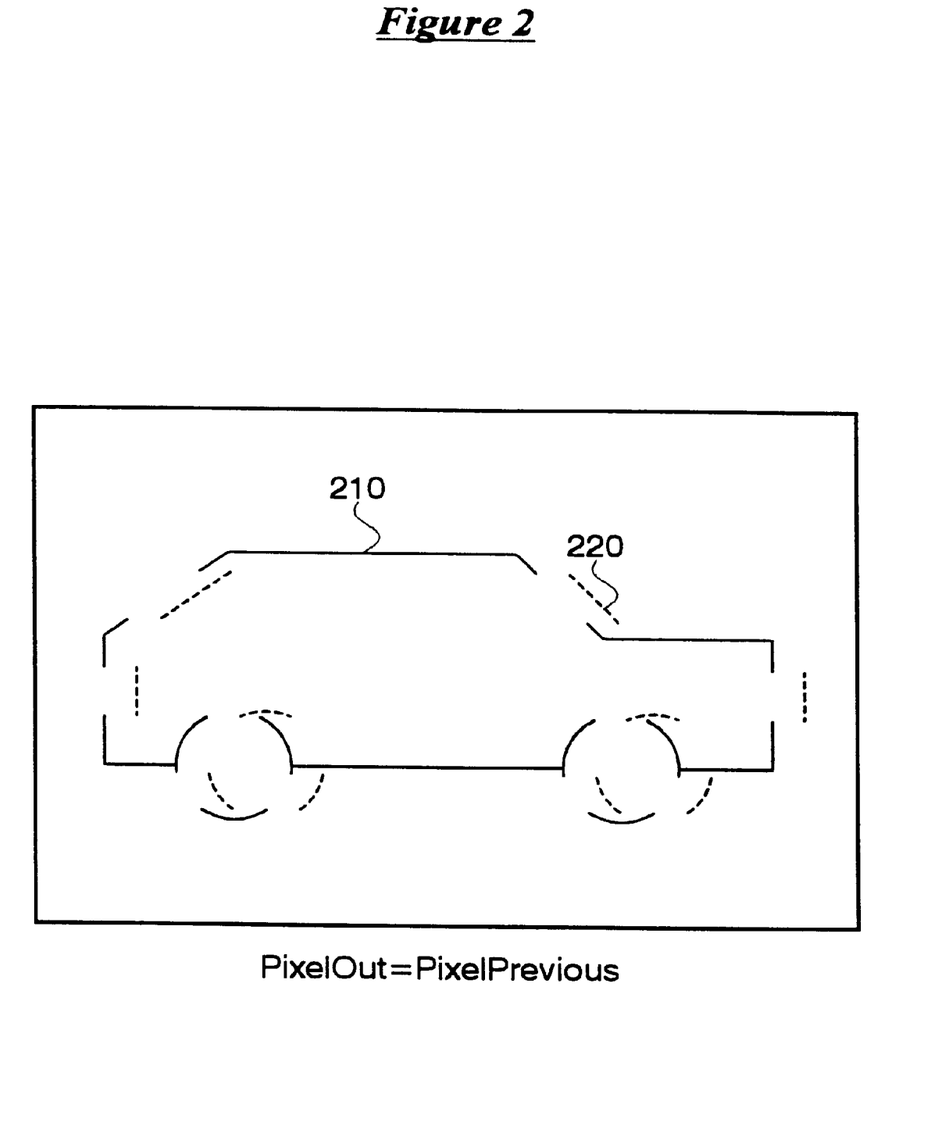
FIG. 2 illustrates an exaggerated example of motion blur caused by motion between two successive video fields.

For example, FIG. 2 illustrates an exaggerated effect of the motion artifacts caused by filling in the missing scan lines with the scan lines of the previous field. Referring to FIG. 2 the pixels for each missing scan line (PixelOut) are generated by selecting the matching pixel from the previous field (PixelPrevious). However, in a video image where there is motion such as a car driving horizontally across the video screen, the scan lines from the previous video field have been captured one thirtieth of a second before the scan lines of the current field. Thus, as illustrated in FIG. 2, the current video field scan lines 220 are further to the right than the scan lines from the previous video field 210. Thus, simply using the scan lines from the previous video field can result in unsightly motion artifacts in the displayed frame.

Figure 3:
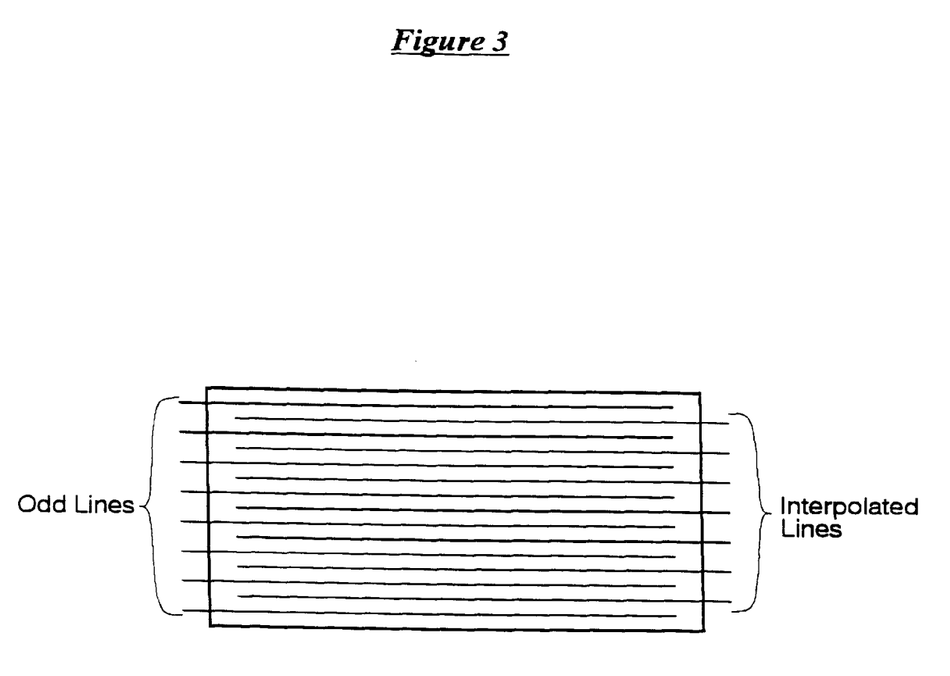
FIG. 3 illustrates an NTSC odd video field with interpolated even fields thereby creating a full video frame.

Another method of filling in the missing scan lines is to interpolate the missing scan lines. For example, in FIG. 3 a video frame is illustrated with a set of odd scan lines. To fill in the missing even scan lines between the odd scan lines a set of interpolated scan lines is created. Several different methods have been used to create the interpolated scan lines between the scan lines of the video field that needs to be filled.

Figure 4:
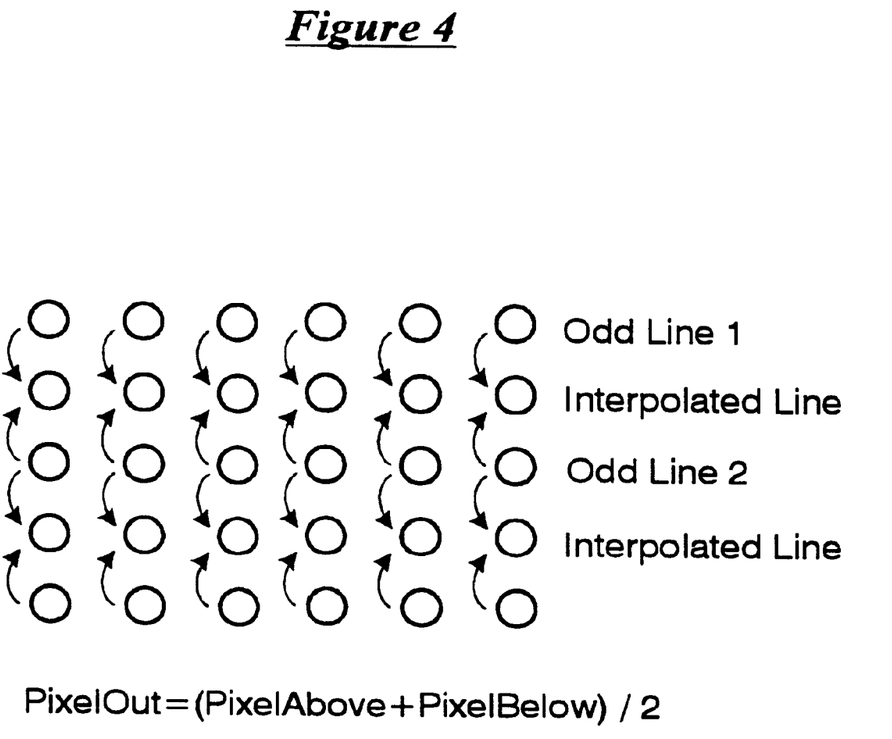
FIG. 4 illustrates a method of creating an interpolated video scan line using above and below pixel information.

A first simple method to interpolate the missing scan lines is to simply fill each pixel with the average of the pixel above (PixelAbove) and the pixel below (PixelBelow). Thus, as illustrated in FIG. 4, PixelOut equals (PixelAbove+PixelBelow)/2. FIG. 4 graphically illustrates this technique wherein the interpolated pixels are created from the odd scan line above the interpolated scan line and the odd scan line below the interpolated row. This method does not exhibit the motion artifacts created by simply using the pixels from the previous field. However, this interpolation method may generate a blurred image. The image is blurred since none of the information actually from that particular scan line (i.e., the previous scan line) is used to generate the missing scan line.

Figure 5:
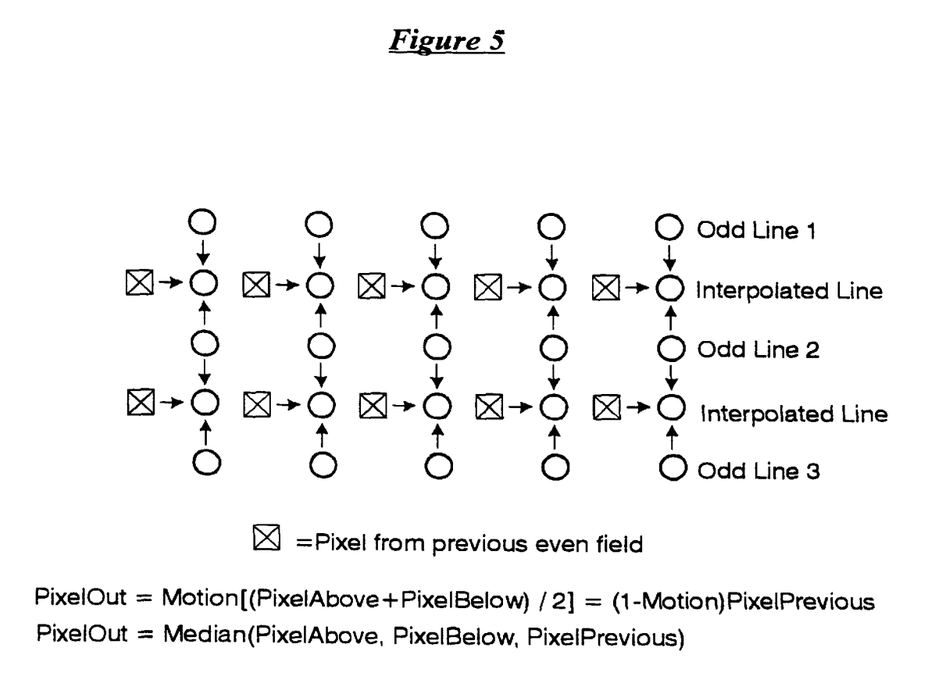
FIG. 5 illustrates a method of creating an interpolated video scan line using above, below, and previous pixel information.

FIG. 5 illustrates a method of interpolating missing scan lines that is similar to the method of FIG. 4 except that information from the previous field is used to help interpolate the missing scan lines. The method of FIG. 5 uses a weighted motion value to determine how much of an affect the previous field's pixels will be used to create the interpolated scan lines. When the motion value is high then the method will mostly use the pixels above and below the interpolated pixel to generate the desired pixel. However, when the motion is low then the method will mostly use the pixel information from the previous video field.

The weighted motion interpolation method of FIG. 5 is defined mathematically as:

PixelOut=Motion*[(PixelAbove+PixelBelow)/2]+(1-Motion)*PixelPrevious

The motion value (Motion) is a value between zero and one whereas values close to one indicate a field with a large amount of motion and values close to zero indicate a field with very little motion.

Another method of combining the above pixel, the below pixel and the pixel from the previous field is to select the median of those three pixels. This method is expressed mathematically as:

PixelOut=Median (PixelAbove, PixelBelow, PixelPrevious)

FIG. 5 lists this alternate version that uses the above pixel, the below pixel and the pixel from the previous field is to interpolate the desired pixel.

All of the methods of line-doubling described so far exhibit "jaggies" (stair-step artifacts on diagonal lines) since the diagonal directions are not taken into consideration. Specifically, only the pixels above, below and from the previous field are taken into consideration. Present invention introduces new methods of interpolating pixels which take into account the pixels diagonal from the desired interpolated pixel.

Figure 6:
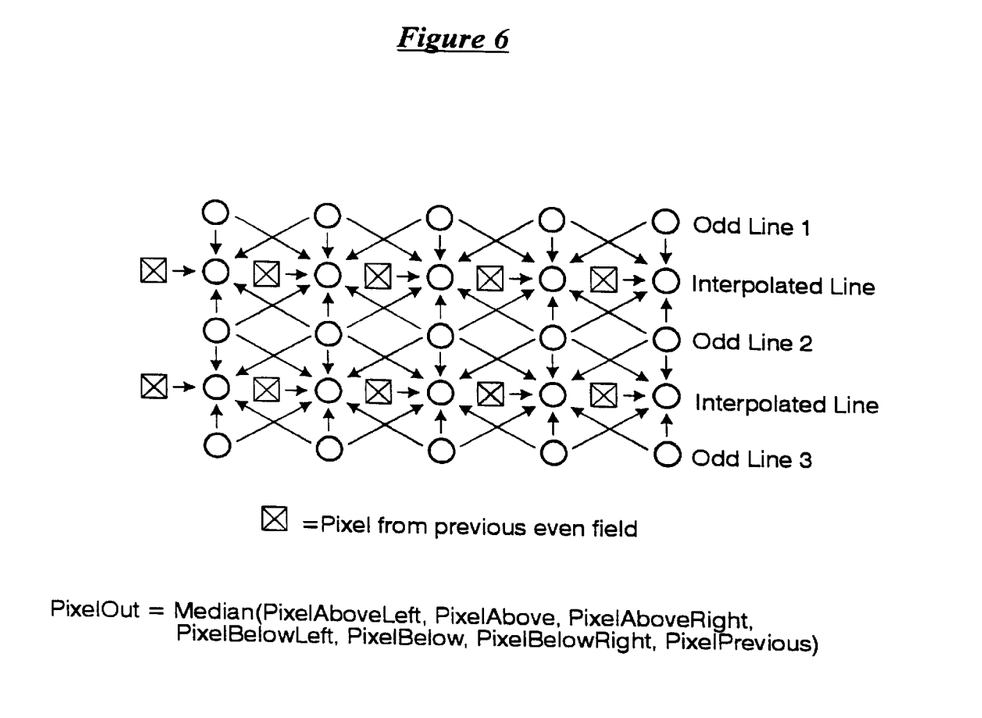
FIG 6 illustrates one method of creating an interpolated video scan line using above, below, diagonal, and previous pixel information.

FIG. 6 graphically illustrates a first interpolation method of the present invention. Referring to FIG. 6, the majority of pixels interpolated using the method of the present invention take into account the four pixels diagonal from the desired interpolated pixel in addition to the above pixel, the below pixel, and the pixel from the previous field. Thus, in total, seven different pixels are used to help determine the current interpolated pixel. For pixels that are on the edge of the screen only the above pixel, the below pixel, the pixel from the pervious field, and two diagonal pixels are used. Thus for pixels on the edge of the screen only five different pixel values are used to determine the desired interpolated edge pixel.

The present invention suggests two possible methods of using the four diagonal pixels from the desired interpolated pixels in order to generate the desired pixel. A first method is to select a median of the pixels used to generate the desired interpolated pixel; and a second method is to select a median from pixels on the lowest contrast path.

Median Of The Seven Pixels Method

A first method of using seven different pixels to interpolate a desired pixel is to determine the median of all seven different pixels used to interpolate the current pixel. Specifically, as illustrated in FIG. 6, the method would select the pixel having the median luminance of: (1) the pixel above and to the left (PixeLAboveLeft), (2) the pixel above (PixelAbove), (3) the pixel above and to the right (PixelAboveRight), (4) the pixel below and to the left (PixelBelowLeft), (5) the pixel below (PixelBelow), (6) the pixel below and to the right (PixelBelowRight), (7) and the pixel from the previous video field (PixelPrevious). Since there are seven pixels there will always be specific median pixel to select. This method is intrinsically motion adapted and provides very good edge preservation in the diagonal directions. Although this embodiment selects the median using the luminance value, other pixel characteristics such as Chrominance or Hue could be used.

Figure 7:
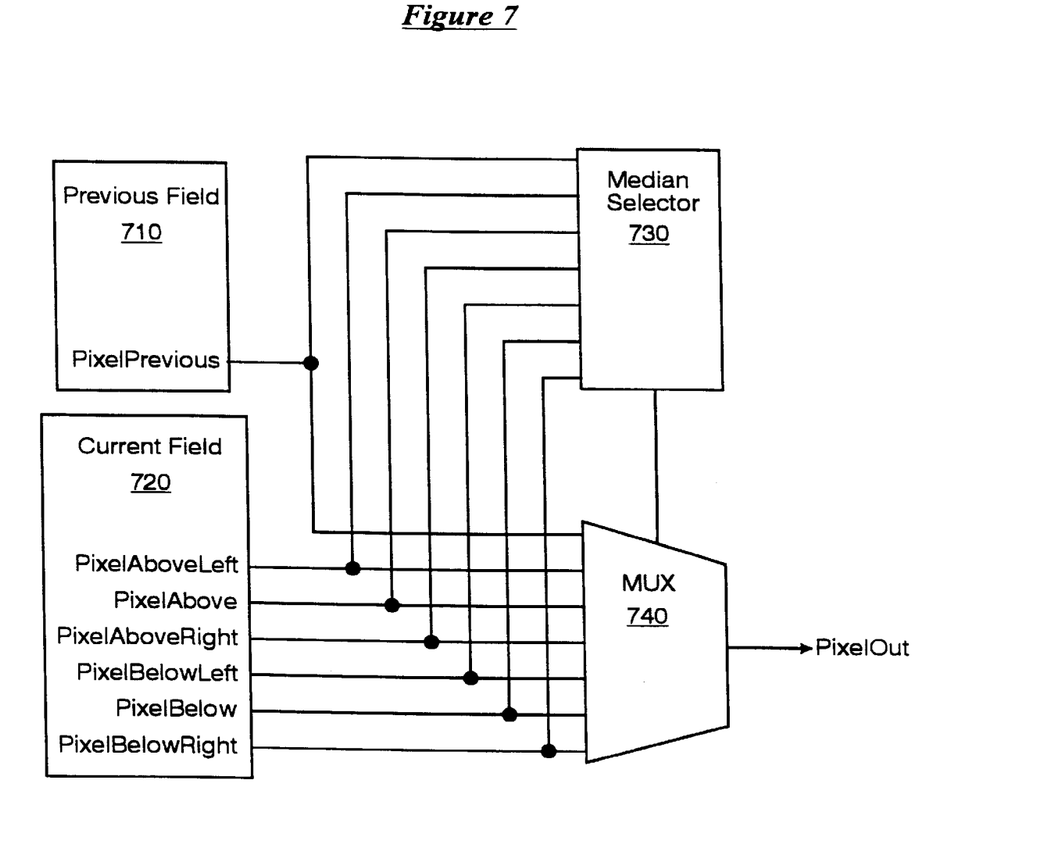
FIG. 7 illustrates block diagram of a circuit for implementing the method of FIG. 6.

FIG. 7 illustrates a block diagram of one implementation of such a pixel interpolator. Specifically pixel information from the previous field 710 and the current field 720 is fed into a median selector 730. The median selector 730 selects the median pixel from the seven pixels provided. An example of a seven sample median selector is described in the co-pending patent application entitled "Method and Hardware Apparatus For Implementing A N-Sample Median Filter" filed Nov. 7, 1997, having Ser. No. 08/966,079 that is hereby incorporated by reference. After selecting the median pixel the median selector 730 controls a multiplexor 740 that generates the output pixel. The output pixel is placed into the interpolated scan line.

Minimal Variance Direction Pixel Median Method

The second method of using the seven different pixels to determine the content of the desired interpolated pixel is to select a direction through the desired pixel with the least amount of variance and then select the median of the pixels on that direction. The method will be described with reference to FIGS. 8*a*, 8*b*, and 9.

Figure 8A:
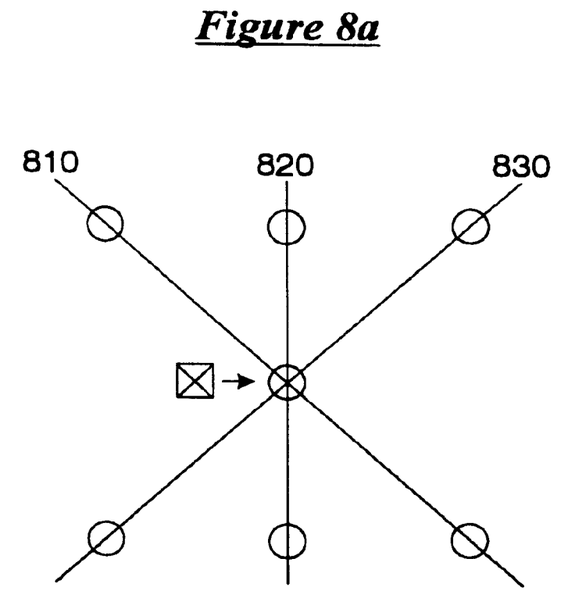
FIG. 8a illustrates three interpolation directions through an interpolated pixel.

Referring to FIG. 8*a*, a desired pixel 800 is illustrated in the center of the other pixels that will be used to create the desired interpolated pixel. A first direction 810 through the above left pixel, the desired pixel 800, and the below right pixel can have its variance determined by subtracting the value of the upper left pixel from the lower right pixel and taking absolute value. The variance is also calculated for the other directions including the vertical direction 820 with the above pixel and the below pixel (PixelAbove and PixelBelow) and the other diagonal direction 830 using the above right pixel and the below left pixel (PixelAboveRight and PixelBelowLeft). The direction with the minimal variance is selected such that the two pixels from that direction are used to help select the desired interpolated pixel 800. Specifically, the two pixels from the direction with the smallest amount of variance and the pixel from the previous field are used. Using those three pixels, the median pixel is selected as the interpolated pixel.

Figure 9:
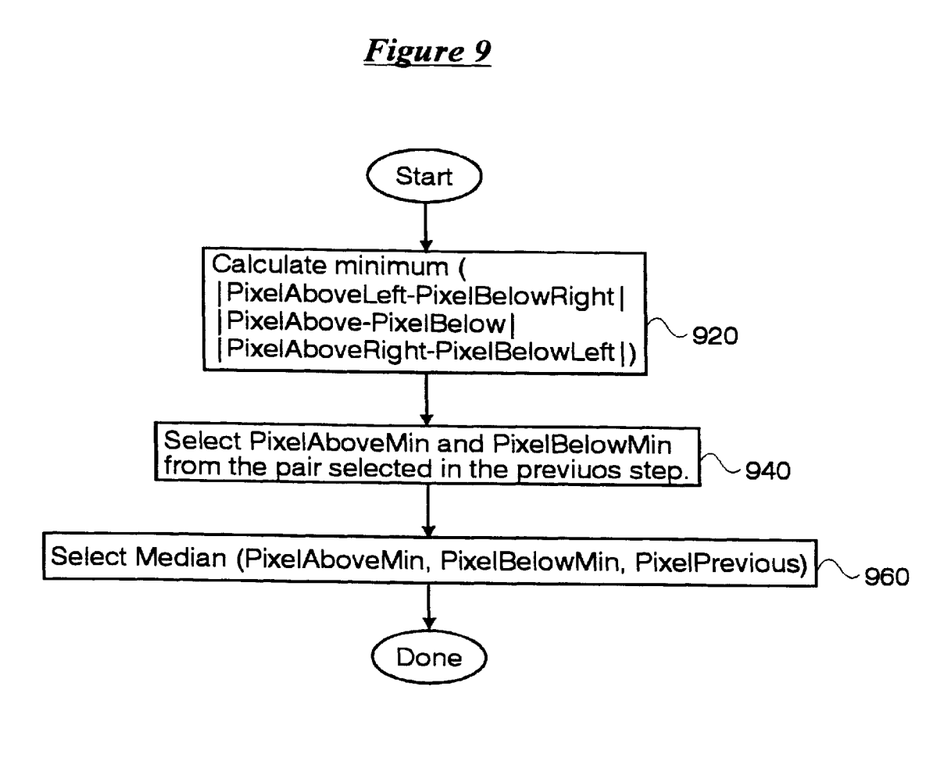

FIG. 9 sets forth the method in detail. Specifically, FIG. 9 illustrates a flow chart describing a method using the minimal direction variance pixels to select the interpolated pixel. The first step, step 920, is to calculate the direction with the minimal variance. The minimum of the three absolute value differences is calculated at step 920. Specifically the minimum of the absolute value of PixelAboveLeft−PixelBelowRight, the absolute value of PixelAbove 5 PixelBelow, and the absolute value of PixelAboveRight−PixelBelowLeft is selected. From the selected minimum variance direction, the pixels used to create that pair are put into PixelAboveMinimum and PixelBelowMinimum, at step 940. Finally, at step 960, a median is selected between the PixelAboveMinimum, the PixelBelowMinimum, and the PixelPrevious.

Figure 8B:
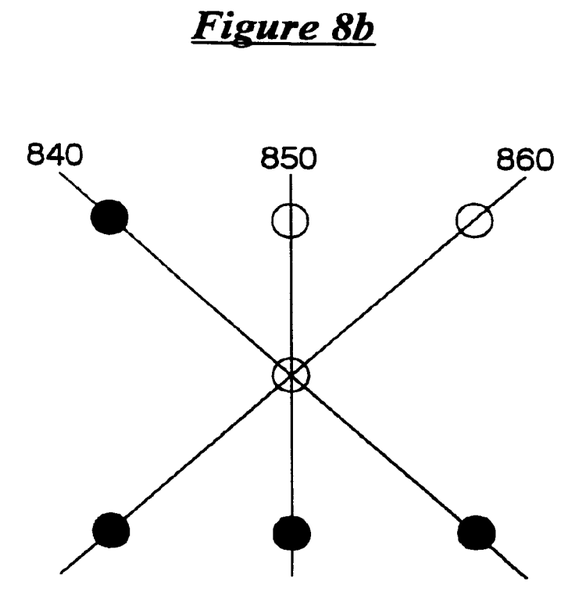

FIG. 8*b* illustrates an example of how this second method can create a desirable interpolated pixel. In FIG. 8*b* the above left pixel (PixelAboveLeft) is dark but the above pixel (PixelAbove) and the above right pixel (PixelAboveRight) are very light. Furthermore, all the below pixels including the below left pixel (PixelBelowLeft), the directly below pixel (PixelBelow), and below right pixel (PixelBelowRight) are all dark. The minimal variance median method of the present invention selects the direction with the minimal amount of variance. Referring to FIG. 8*b*, direction 840 is selected since the above left pixel (PixelAboveLeft) and below right pixel (PixelBelowRight) are both dark and thus there will be minimal variance. In the final step the median pixel of the above left pixel (PixelAboveLeft), the below right pixel (PixelBelowRight), and the pixel from the previous field is selected. The selected median pixel will likely be a dark pixel since both the above left pixel (PixelAboveLeft) and below right pixel (PixelBelowRight) are dark. This will cause an even diagonal dark edge in FIG. 8*b*.

Figure 10:
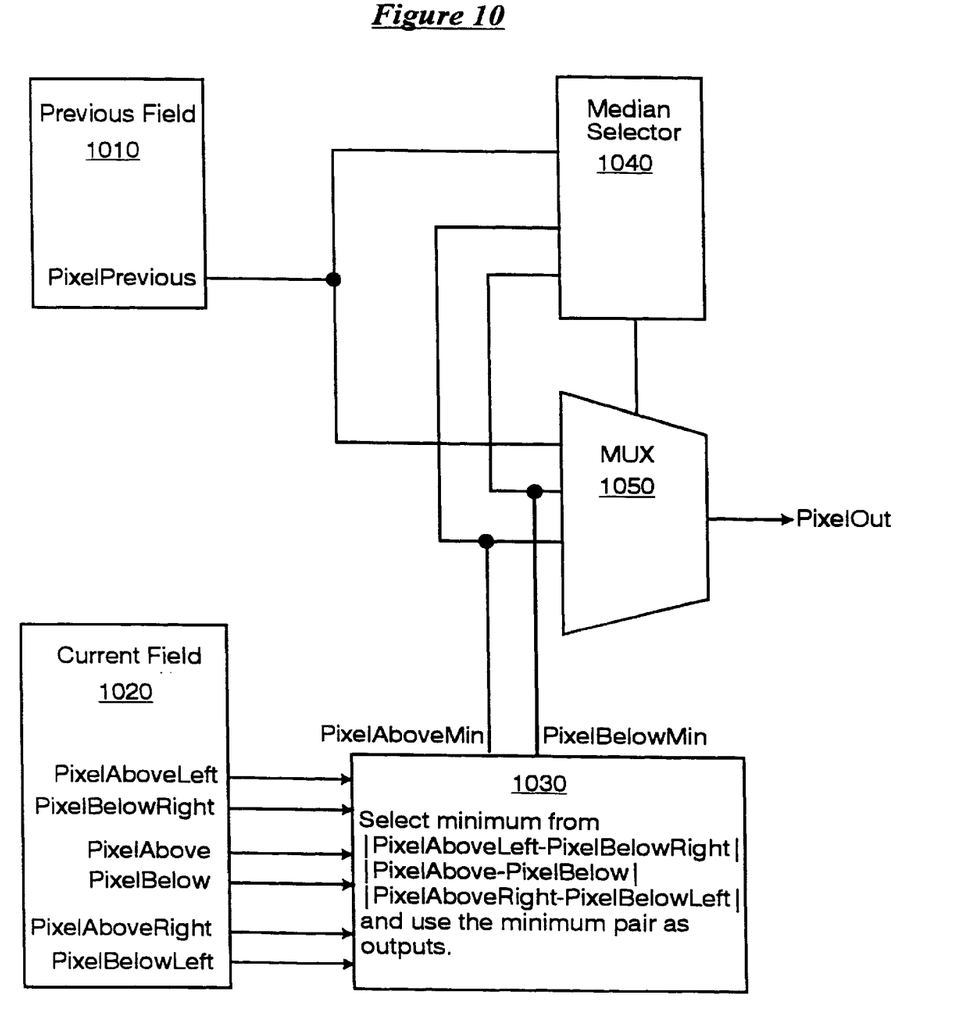
FIG. 10 illustrates block diagram of a circuit for implementing the method of FIG. 9.

FIG. 10 illustrates a block diagram implementation of the second embodiment. As illustrated in FIG. 10 the pixels from the current field are first used to select a minimum variance direction in logic 1030. From the minimum variance logic 1030, the pixel pair from the direction with the minimum variance are output to median selector and a multiplexor. Also going to the median selector 1040 and the multiplexor 1050 is the pixel from the previous frame. The median selector 1040 then selects the median pixel from the previous field the pixel from the minimum variance direction above and the pixel from the minimum variance direction below. Once this median is selected, the median selection is used to control multiplexor 1050 to output the interpolated pixel.

The foregoing has described a line doubling method and apparatus. It is contemplated that changes and modifications may be made by one of ordinary skill in the art, to the materials and arrangements of elements of the present invention without departing from the scope of the invention.

What is claimed is:

1. A computer implemented method of interpolating a desired pixel between scan lines, said method comprising selecting the median pixel from one of seven pixels, those seven pixels being a first pixel above and to the left of a desired pixel, a second pixel above the desired pixel, a third pixel above and to the right of the desired of the desired pixel, a fourth pixel below and to the left of the desired pixel, a fifth pixel below the desired pixel, a sixth pixel below and to the right of the desired pixel, and a seventh pixel from the previous video field having the same position of the desired pixel.

2. The method as claimed in claim 1 wherein said median pixel is selected based upon pixel luminance.

3. The method as claimed in claim 1 wherein said first, second, third, fourth, fifth and sixth pixels are retrieved from a current video field.

4. A computer implemented method of interpolating a desired pixel between scan lines, said method comprising the steps of:

selecting a minimal variance direction between
        a first direction comprising a first pixel above and to the left of the desired pixel and a second pixel below and to the right of the desired pixel,
        a second direction comprising a third pixel above the desired pixel and a fourth pixel below the desired pixel, and
        a third direction comprising a fifth pixel above and to the right of the desired pixel and a sixth pixel below and to the left of the desired pixel,
    selecting the two pixels comprising the minimal variance direction as a minimal variance above pixel and a minimal variance below pixel; and
    selecting the median pixel of the minimal variance above pixel, the minimal variance below pixel, and a pixel from the previous video field having same position of the desired pixel.

5. The method as claimed in claim 4 wherein said median pixel is selected based upon pixel luminance.

6. The method as claimed in claim 4 wherein said first, second, third, fourth, fifth and sixth pixels are retrieved from a current video field.

7. An apparatus for line-doubling, said apparatus comprising:
- a previous video field memory, said previous field memory storing a first plurality of pixels from a previous video field;
- a current video field memory, said current field memory storing a second plurality of pixels from a current video field; and
- a median pixel selector, said median pixel selecting a median pixel from a first pixel in said current video field memory above and to the left of a desired pixel, a second pixel in said current video field memory above the desired pixel, a third pixel in said current video field memory above and to the right of the desired pixel, a fourth in said current video field memory pixel below and to the left of the desired pixel, a fifth pixel in said current video field memory below the desired pixel, a sixth pixel in said current video field memory below and to the right of the desired pixel, and a seventh pixel in the previous video field memory having same position of the desired pixel.

8. The apparatus as claimed in claim 7 wherein said median pixel selector selects pixel is selected based upon pixel luminance.

9. An apparatus for line-doubling, said apparatus comprising:
- a previous video field memory, said previous field memory storing a first plurality of pixels from a previous video field;
- a current video field memory, said current field memory storing a second plurality of pixels from a current video field; and
- a minimal variance selector, said minimal variance selector selecting a minimal variance above pixel and a minimal variance below pixel comprising from a minimal variance direction between
  - a first direction comprising a first pixel above and to the left of the desired pixel and a second pixel below and to the right of a desired pixel,
  - a second direction comprising a third pixel above the desired pixel and a fourth pixel below the desired pixel, and
  - a third direction comprising a fifth pixel above and to the right of the desired pixel and a sixth pixel below and to the left of the desired pixel; and
- a median pixel selector, said median pixel selecting a median pixel from the minimal variance above pixel, the minimal variance below pixel, and a pixel from the previous video field having same position of the desired pixel.

10. The apparatus as claimed in claim 9 wherein said median pixel selector selects pixel is selected based upon pixel luminance.

* * * * *

UNITED STATES PATENT AND TRADEMARK OFFICE
CERTIFICATE OF CORRECTION

PATENT NO.     : 6,295,091 B1
DATED          : September 25, 2001
INVENTOR(S)    : Huang It is certified that error appears in the above-identified patent and that said Letters Patent is hereby corrected as shown below:

Column 5,
Line 46, delete "5", insert -- - --.

Signed and Sealed this

First Day of October, 2002

Attest:

Attesting Officer

JAMES E. ROGAN
Director of the United States Patent and Trademark Office